(12) United States Patent
Tilly et al.

(10) Patent No.: US 7,404,577 B2
(45) Date of Patent: Jul. 29, 2008

(54) SEAT BELT ANCHORING SYSTEM AND METHOD OF INSTALLING A SEAT BELT SYSTEM

(75) Inventors: Thomas Tilly, Algonac, MI (US); Gregory S. Ches, Clinton Township, MI (US); Damond N. Hinatsu, Romeo, MI (US); Mark A. Rychlicki, Montrose, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 297 days.

(21) Appl. No.: 11/205,272

(22) Filed: Aug. 16, 2005

(65) Prior Publication Data

US 2007/0040373 A1    Feb. 22, 2007

(51) Int. Cl.
    *B60R 22/00* (2006.01)
(52) U.S. Cl. ................................... 280/801.1

(58) Field of Classification Search .............. 280/801.1; 297/468, 464, 470, 473, 481; 248/220.1, 248/300
See application file for complete search history.

(56) References Cited

U.S. PATENT DOCUMENTS

| 4,482,188 | A | | 11/1984 | Tilly et al. ................ 297/473 |
| 5,215,332 | A | | 6/1993 | De Sloovere ............ 280/801.1 |
| 5,415,430 | A | * | 5/1995 | Valasin .................... 280/801.1 |
| 6,447,010 | B1 | * | 9/2002 | Curtis et al. ............. 280/801.1 |
| 7,156,198 | B2 | * | 1/2007 | Nishide et al. ............. 180/273 |
| 2004/0041389 | A1 | * | 3/2004 | Nishide et al. .......... 280/801.1 |

* cited by examiner

*Primary Examiner*—Robert A. Coker

(57) ABSTRACT

A seat belt anchoring system for a vehicle seat includes an anchor for seat belt webbing having a mounting portion positionable with respect to the seat to face rearward and rigidly securable with respect to the seat from behind the seat. The anchor also has a belt retaining portion angled with respect to the mounting portion so that it is operatively connectable with the seat belt webbing outboard of the seat. A method of installing a seat belt system is also provided.

6 Claims, 3 Drawing Sheets

SEAT BELT ANCHORING SYSTEM AND METHOD OF INSTALLING A SEAT BELT SYSTEM

TECHNICAL FIELD

This invention relates to a seat belt anchoring system having a lower outboard seat belt anchor installable from behind a vehicle seat and a method of installing a seat belt system.

BACKGROUND OF THE INVENTION

Vehicles typically include seat restraints such as three-point seat belt webbing anchored generally at shoulder height, and on both sides of a seat. A lower outboard seat belt anchor is typically located outboard of the seat and is secured to the seat or to the floor. Securing the lower outboard seat belt lap anchor is often difficult because clearances between the seat and the vehicle body frame are insufficient for tool accessibility without adjusting the position of the seat. For instance, a center pillar (B-pillar) is typically adjacent to the outboard side of the seat. An assembly tool such as a bolt driver is frequently too large to fit between the seat and the center pillar, especially when pillar trim and/or floor trim is installed. Accordingly, when installing a lap anchor, an assembler typically must adjust the longitudinal position of the seat to allow clearance for the tool in order to access the anchor.

SUMMARY OF THE INVENTION

A seat belt anchoring system for a vehicle seat and a method of installing a seat belt system are provided that enable a relatively simple lower outboard seat belt anchor to be secured to the seat with a minimal number of assembly steps, thus minimizing component cost and assembly time. The seat belt anchoring system includes an anchor for seat belt webbing. The anchor has a mounting portion positionable with respect to the seat to face rearward. The mounting portion is rigidly securable with respect to the seat from behind the seat. The anchor also includes a belt retaining portion which is angled with respect to the mounting portion so that it is operatively connectable to the seat belt webbing outboard of the seat. As is well understood by those skilled in the art, "outboard" means transversely away from a longitudinal center axis of the vehicle. Preferably, the mounting portion has a fastener opening and is rigidly secured with respect to the seat by a fastener received through the fastener opening.

The seat belt anchoring system may further include a support bracket having an anchor support portion with a complementary fastener opening and a seat attachment portion angled with respect to the anchored support portion and attachable to the seat. The anchor support portion supports the anchor and the respective fastener openings are concentric so that a fastener may be received therethrough to secure the mounting portion to the anchor support portion. Preferably, a weld nut is positioned at the complementary fastener opening to retain the fastener.

Preferably, the seat includes a seat adjuster that is operative for fore and aft adjustment of the seat within the vehicle. A rivet may be used to attach the seat attachment portion rigidly to the seat adjuster.

The mounting portion of the anchor may have a base portion with an extension portion that extends therefrom. The extension portion may include a neck portion with a tab portion that generally forms a T-shape. The anchor support portion may have a support opening, such as a slot that is sufficiently sized to receive the extension portion to support the mounting portion prior to rigid securement with the fastener. Specifically, the tab portion may rest against the anchor support portion when the extension portion is placed within the slot so that the base portion hangs therefrom. The anchor, including the mounting portion and the belt retaining portion, may be a unitary member or may be separate members integrally connected. When the anchor is secured to the seat, the belt retaining portion is positioned outboard of and adjacent to the seat and forward of the mounting portion for securing seat belt webbing between a portion of a vehicle body frame (such as a center pillar) that is adjacent to the seat.

A method of installing a seat belt system includes positioning a lower outboard seat belt anchor on a preassembled seat installed in a vehicle and positioning an attachment tool rearward of the seat. After the positioning steps, the method includes rigidly securing the anchor to the seat from behind the seat with the attachment tool. Positioning the anchor on the preassembled seat prior to securing the anchor to the seat may include hanging the anchor from the seat. The positioning steps and the securing step may be performed as a one-handed operation to save assembly time and cost.

The vehicle may have a generally vertical center pillar that is generally adjacent and outboard of the seat. In this case, the method may further include securing a seat belt retractor to the pillar, trimming the pillar and installing the preassembled seat in the vehicle, all of which are preformed prior to positioning the anchor, positioning the tool and rigidly securing the anchor to the seat. The method may further include operatively connecting seat belt webbing to the anchor, such as by looping the webbing through a retainer opening.

Because the anchor is designed to be secured to the seat from behind the seat, the method may be performed without longitudinal seat adjustment steps being necessary. Thus, especially for power seats, vehicles need not be powered on the assembly line in order to install the lower outboard seat bracket. Specifically, if the positioning steps and securing step discussed above are performed with a first anchor and a first preassembled seat on a first vehicle with the first preassembled seat being characterized by a first longitudinal position, then the same positioning steps and securing steps may be performed on a second anchor on a second preassembled seat installed in a second vehicle, and, even though the second seat is in a second longitudinal position different than the first longitudinal position, adjustment of the longitudinal positions of either of the seats is not necessary prior to securing the anchors.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
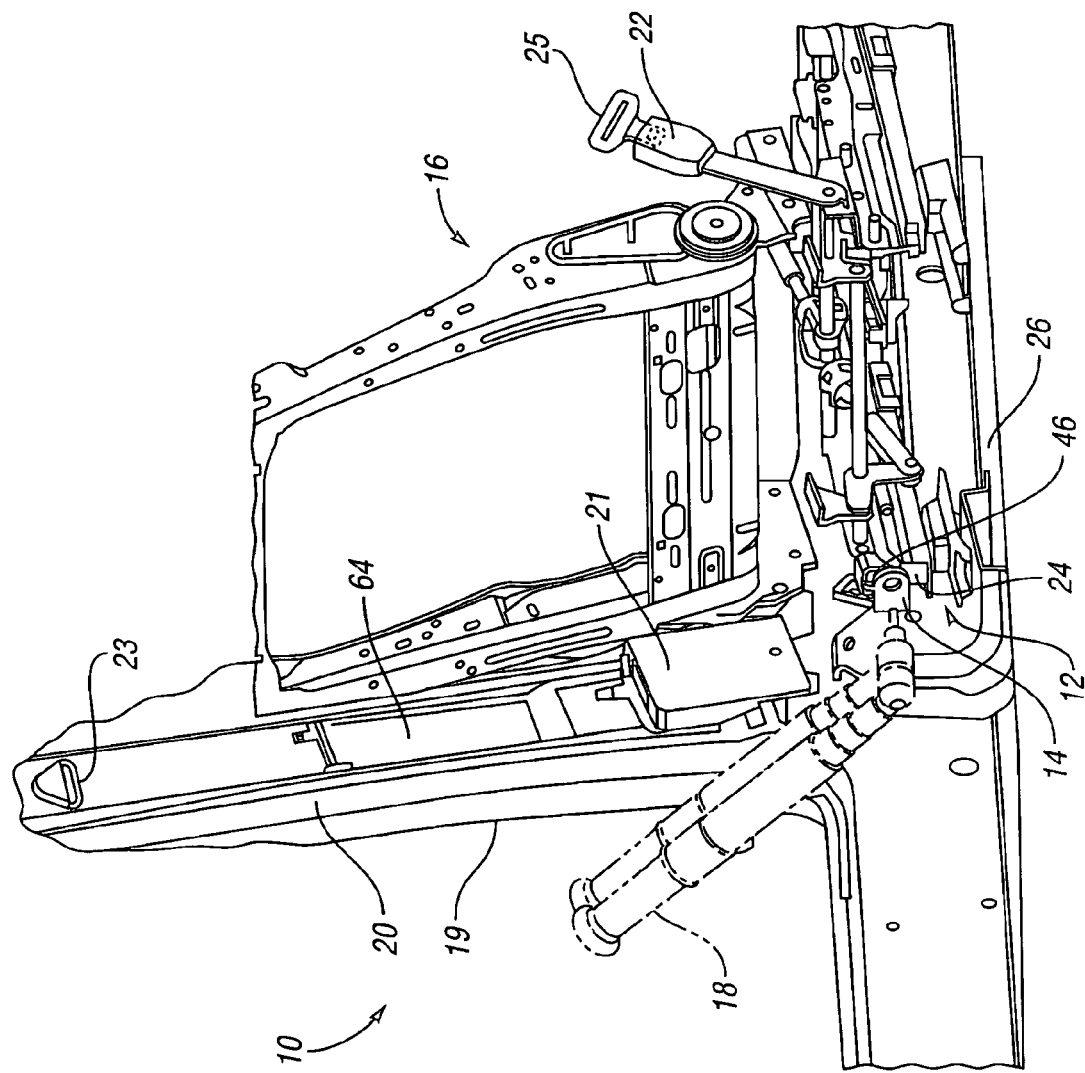
FIG. 1 is a schematic perspective view of a preassembled seat installed in a vehicle, with a seat belt anchoring system including a lower outboard seat belt anchor positioned for securement to the seat from behind the seat by an assembly tool (shown in phantom)

Referring to the drawings wherein like reference numbers refer to like components, FIG. 1 illustrates a vehicle 10 with a seat belt anchoring system 12 that allows a lower outboard seat belt anchor 14 to be secured to a preassembled vehicle seat 16 with an assembly tool 18 positioned behind the seat 16 (i.e., behind a support bracket 46 which is part of the seat 16). Seat belt webbing 17 (shown in FIG. 4) is secured to the anchor 14 and to the vehicle frame 19 such as at a center pillar 20, through guide loop 23 and to a retractor 21. Specifically, the seat belt webbing 17 (not shown in FIG. 1) has one end maintained within the retractor 21 and extends to the pillar mounted guide loop 23, from the pillar mounted guide loop 23 to the buckle 22 through a latch 25 attached to the buckle 22 and to the lower outboard seat belt anchor 14, as will be well understood by those skilled in the art.

The lower outboard seat belt anchor 14 is secured to support bracket 46 which in turn is secured to a seat adjuster 24 (both of which are included in the preassembled seat 16). The seat adjuster 24 allows fore and aft movement of the seat 16 with respect to the vehicle floor 26 as is well understood by those skilled in the art. For instance, the adjuster 24 may include upper and lower tracks with the upper track moveable with respect to the lower track which is fixed to the vehicle floor 26.

Figure 2:
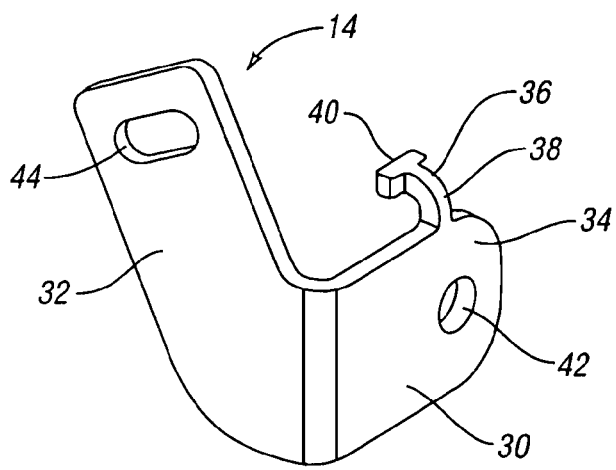
FIG. 2 is a schematic perspective view of the lower outboard seat belt anchor of FIG. 1.

Referring to FIG. 2, the lower outboard seat belt anchor 14 is shown in greater detail. The anchor 14 is shown as a unitary component which is stamped, cast or otherwise formed in one piece. Alternatively, the anchor may be two or more pieces made integral by any connective means known to those skilled in the art, such as welding, riveting, fastening, etc.

The anchor 14 includes a mounting portion 30 that is angled with respect to the belt retaining portion 32. The mounting portion 30 has a base portion 34 with an extension portion 36 extending therefrom. The extension portion 36 has a neck portion 38 and a tab portion 40 arranged generally in a T-shape with respect to one another. A fastener opening 42 is machined or otherwise formed through the rearward face 43 (indicated in FIG. 4) of the mounting portion 30. A belt opening 44 is machined or otherwise formed in the belt retaining portion 32 for securing the seat belt webbing 17 (see FIG. 4) with respect to the anchor 14.

Figure 3:
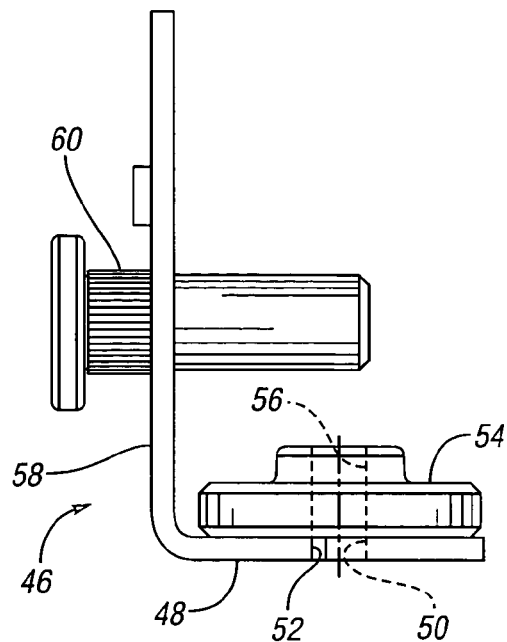
FIG. 3 is a schematic plan view of a support bracket secured to the seat of FIG. 1 on which the anchor is secured.

Referring again to FIG. 1, the seat belt anchoring system 12 also includes the support bracket 46 on which the anchor 14 is supported prior to securement to the seat adjuster 24 with the tool 18. Referring now to FIG. 3, the support bracket 46 is shown in greater detail. The support bracket 46 has an anchor support portion 48 that includes a complementary fastener opening 50 and a support opening or slot 52. A weld nut 54 is welded to the inner face of the anchor support portion 48 and preferably has a threaded opening 56 that mates (i.e., aligns) with the complementary fastener opening 50.

Figure 4:
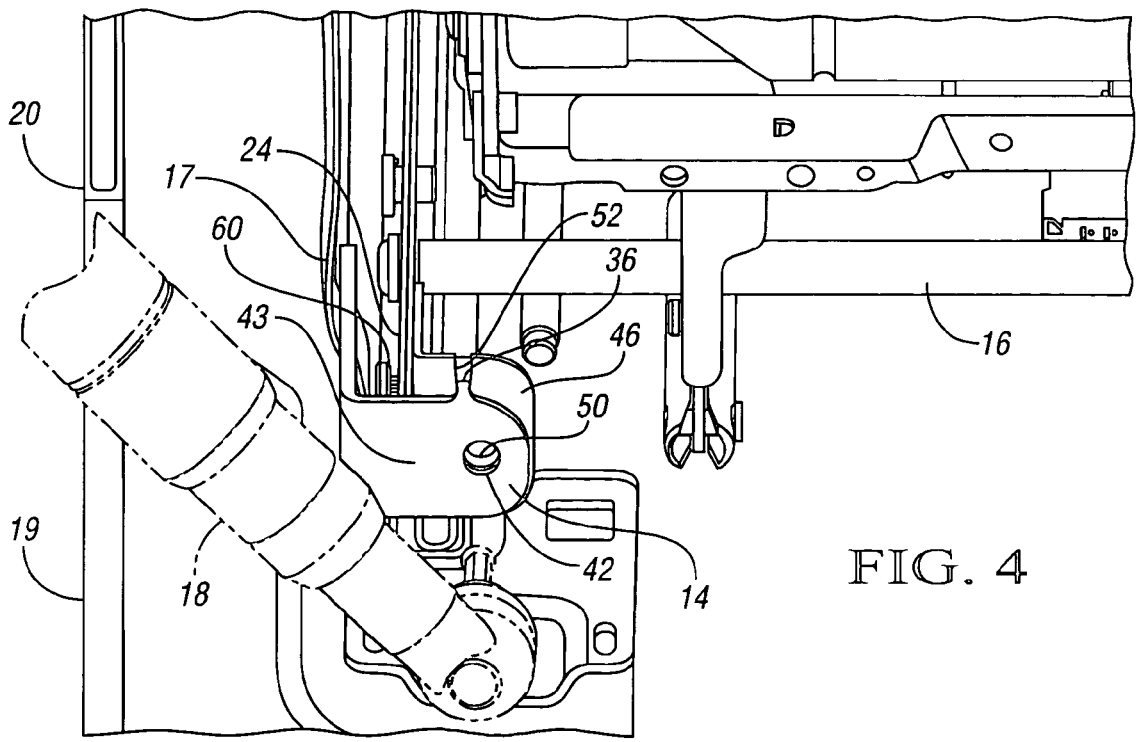
FIG. 4 is a schematic perspective fragmentary view of the lower outboard seat belt anchor of FIGS. 1 and 2 supported at the support bracket of FIGS. 1 and 3 for securement to the seat with the assembly tool (shown in phantom) from behind the seat.

The support bracket 46 also includes a seat attachment portion 58 that is angled with respect to the anchor support portion 48. A rivet 60 is supported at the seat attachment portion 58. As best illustrated in FIG. 4, the rivet 60 secures the support bracket 46 to the seat adjuster 24. FIG. 4 also best illustrates that the slot 52 is sized to receive the extension portion 36 so that the tab portion 40 (visible in FIG. 2) is restrained at the inner face of the bracket 46 and thereby held against the support bracket 46 so that the anchor 14 hangs from the bracket 46 prior to securement with a bolt or other fastener by the tool 18. When the extension portion 36 is hung in the slot 52, the fastener opening 42 and the complementary fastener opening 50 are concentric. The tool 18 may drive a bolt through the rearward face 43 of the anchor 14 at the concentric fastener openings 42, 50 from behind the seat 16. Thus, the tool 18 need not be positioned between the frame 19 or the center pillar 20 and the seat 16 in order to secure the anchor 14 to the seat 16. Because the anchor 14 hangs from the support bracket 46 at the slot 52 by the extension portion 36, securing via the tool 18 may be performed with one hand, i.e., the anchor 14 need not be held during the securing step.

Figure 5:
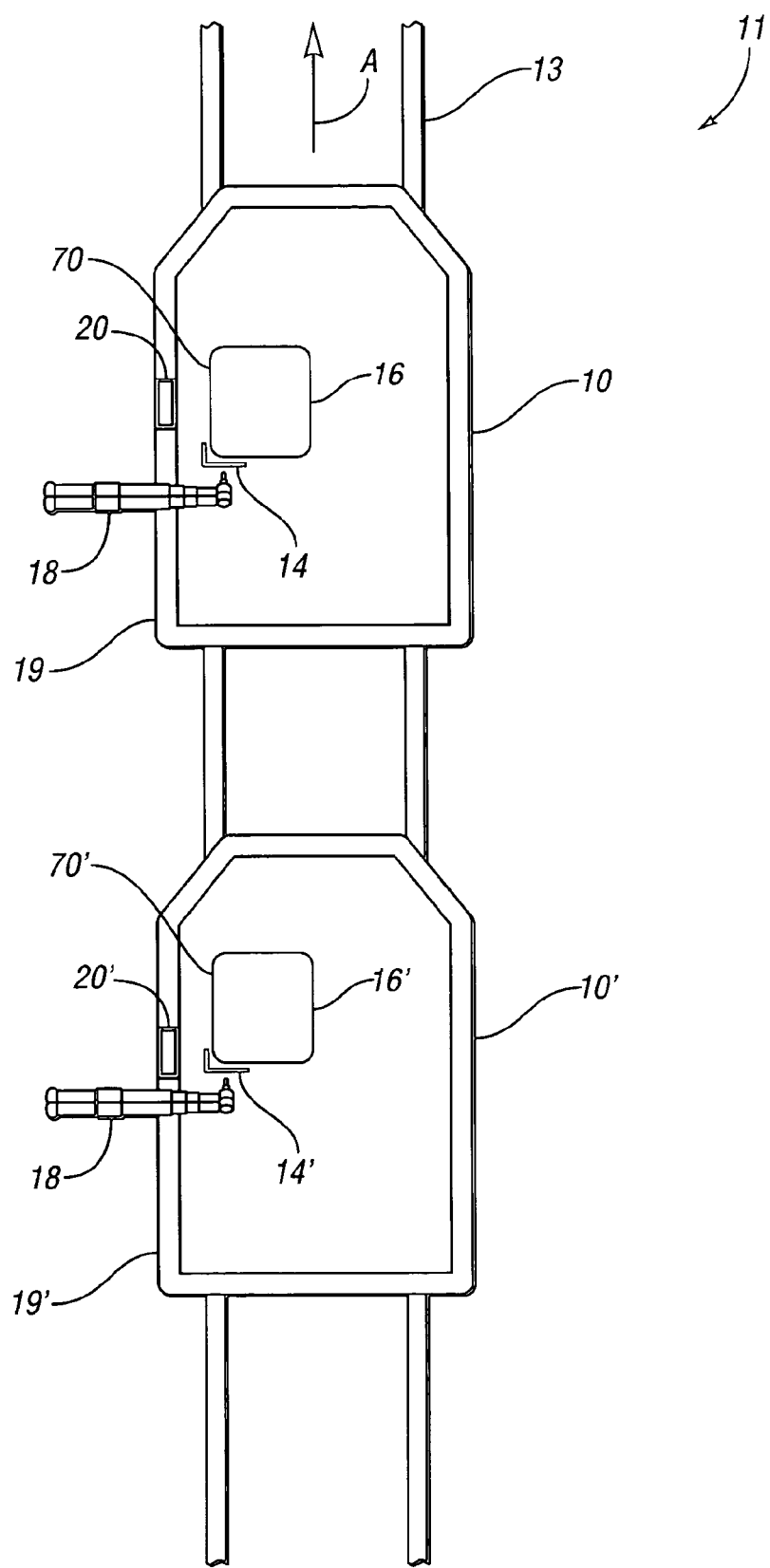
FIG. 5 is a schematic plan view illustration of lower outboard seat belt anchors being installed on vehicles utilizing the method described herein.

FIG. 5 illustrates an assembly line 11 with an assembly process showing lower outboard seat belt anchors being installed on preassembled seats in two different vehicles. As a first vehicle 10 proceeds along the assembly line 11 in the direction of arrow A, the anchor 14 is secured to seat 16 with assembly tool 18. Notably, seat 16 is in a first position with respect to the center pillar 20 on the frame 19. The position of the seat 16 is such that the center pillar 20 is generally midway along the outboard side 70 of the seat 16. After the anchor 14 is secured to the seat 16, a second vehicle 10' proceeds along the assembly line to the anchor securing operation and the tool 18 is positioned behind a second seat 16' to secure a second anchor 14' to the seat 16'. The vehicles 10 and 10' are the same model or type. The vehicle 10' will have moved forward to the position of the vehicle 10 shown in FIG. 5 when the assembly process occurs. Notably, the seat 16' is in a second position with respect to center pillar 20' of vehicle 10'. Specifically, the seat 16' is adjusted forward with respect to the first position of seat 16 in vehicle 10, as is evident by its position relative to the center pillar 20' of frame 19' (i.e., the center pillar 20' is toward the rear of the outboard side 70' of seat 16'). Despite the different positions of the seats 16 and 16', the assembly tool 18 is utilized to secure the respective anchors 14, 14' to seats 16, 16' without the need to adjust the position of either seat. In each case, there is sufficient room behind the seat to operate the tool 18; the fact that the seats are in different positions does not affect the assembly operation. There is no need to adjust the seats, saving a labor-intensive step and, if the seats are electrically powered, eliminating the need to provide power to the seats on the assembly line 11 during the anchor installation process.

With reference to the seat belt system embodiment illustrated in FIGS. 1-5, a method of installing a seat belt system will now be described. The method includes positioning a lower outboard seat belt anchor 14 to a support bracket 46 on a preassembled seat 16 installed in a vehicle 10. Next, the method includes positioning an attachment tool 18 rearward of the seat 16 and, after the positioning steps, rigidly securing the anchor 14 to support bracket 46 on the seat 16 from behind the seat 16. As discussed above, the configuration of the anchor 14 allows the positioning steps and the securing step to be performed as a one-handed operation. Prior to the positioning and securing steps, the method may include securing seat belt retractor 21 and guide loop 23 to the pillar 20 of FIG. 1, trimming the pillar with trim 64, as shown in FIG. 1 and installing the preassembled seat 16 in the vehicle 10. The seat belt webbing 17 may also be operatively connected to the anchor 14 as shown in FIG. 4. Positioning the lower outboard seat belt anchor 14 on support bracket 46 of preassembled seat 16 may include the step of hanging the anchor 14 from the seat 16, i.e., by placing the extension portion 36 within the slot 52 as described with respect to FIGS. 2-4.

Because the securing step is performed from behind the seat, the longitudinal positioning of the seat is not critical. Thus, the method may include positioning a second lower outboard seat belt anchor 14' (see FIG. 5) on a second preassembled seat 16' installed on a second vehicle 10'. The second anchor 14' is substantially identical to the first anchor 14 and a second seat 16' is substantially identical to the first seat 16. Also, the second vehicle 10' is substantially identical to the first vehicle 10 so that respective center pillars 20, 20' are in a substantially identical longitudinal position on the vehicles. The second seat 16' is in a second longitudinal position fore of the first longitudinal position of the first seat 16. The method includes positioning attachment tool 18 rearward of the second seat 16' and rigidly securing the second anchor 14' to the second seat 16' with the tool 18 from behind the seat 16'. Positioning the attachment tool step and rigidly securing the second anchor step are performed without adjusting the longitudinal position of the second seat 16'.

The lower outboard seat belt anchor 14 is designed to provide an easily accessible mounting portion 30 (see FIG. 2) for securement to the vehicle seat 16 via the tool 18 from behind the seat 16, thus alleviating tool clearance problems and the necessity to adjust the position of the seat 16 when securement is at an outboard side of the seat 16. Additionally, the relatively simple design and minimal number of components of the anchor 14 (in fact, the anchor 14 may be only one component) also may present a cost savings with respect to more complex anchor designs that have thus far been used in the art. The anchor 14 is less expensive than relatively complex lower outboard seat belt lap anchors such as (i) a mini buckle that attaches to an anchor that is preattached to the seat before installation in the vehicle or (ii) a quick-connect latch that attaches without the use of power tools to an anchor preattached to the seat before installation in the vehicle While the best mode for carrying out the invention has been described in detail, those familiar with the art to which this invention relates will recognize various alternative designs and embodiments for practicing the invention within the scope of the appended claims.

The invention claimed is:

1. A seat belt anchoring system for a vehicle seat comprising:
 a seat belt anchor for seat belt webbing having:
  a mounting portion positionable with respect to the seat to face rearward and rigidly securable with respect to the seat from behind the seat; wherein the mounting portion has a fastener opening to receive a fastener for rigid securement with respect to the seat; and
  a belt retaining portion angled with respect to the mounting portion so that the belt retaining portion is operatively connectable to the seat belt webbing outboard of the seat; and
 a support bracket having:
  an anchor support portion having a complementary fastener opening; and
  a seat attachment portion angled with respect to the anchor support portion and attachable to the seat so that the anchor support portion supports the anchor and the respective fastener openings are concentric to receive the fastener for rigidly securing the mounting portion to the anchor support portion.

2. The seat belt anchoring system of claim 1, further comprising:
 a weld nut positioned at the complementary fastener opening for retaining the fastener.

3. The seat belt anchoring system of claim 1, wherein the seat includes a seat adjuster operative for fore and aft adjustment of the seat within the vehicle; and
 wherein the seat attachment portion has a rivet therethrough for rigid connection to the seat adjuster.

4. The seat belt anchoring system of claim 1, wherein the mounting portion has a base portion and an extension portion extending therefrom; and
 wherein the anchor support portion has a support opening sufficiently sized to receive the extension portion to thereby support the mounting portion prior to rigid securement with the fastener.

5. The seat belt anchoring system of claim 4, wherein the extension portion has a neck portion and a tab portion generally forming a T-shape; and
 wherein the support opening is a slot extending within the anchor support portion so that the tab portion rests against the anchor support portion and the base portion hangs therefrom when the extension portion is received in the slot.

6. The seat belt anchoring system of claim 1, wherein the anchor is a unitary, one-piece member.

* * * * *